US006917295B2

(12) United States Patent
Groh et al.

(10) Patent No.: US 6,917,295 B2
(45) Date of Patent: Jul. 12, 2005

(54) ROTATABLE LID SWITCH HAVING FOUL WEATHER FEATURE

(75) Inventors: William S. Groh, Knoxville, TN (US); Albert Lee, IV, Seymour, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 10/315,896

(22) Filed: Dec. 10, 2002

(65) Prior Publication Data

US 2004/0113795 A1 Jun. 17, 2004

(51) Int. Cl.[7] ................................................ G08B 23/00

(52) U.S. Cl. .................................................... 340/573.3

(58) Field of Search ....................................... 340/573.3

(56) References Cited

U.S. PATENT DOCUMENTS 4,399,432 A * 8/1983 Lunn ....................... 340/573.3
6,220,720 B1 * 4/2001 Stephens .................... 362/205

OTHER PUBLICATIONS http://martinmetsupply.com/durometers_index.htm—Feb. 9, 2004.*

* cited by examiner

*Primary Examiner*—Jeffery Hofsass
*Assistant Examiner*—Jennifer Stone
(74) *Attorney, Agent, or Firm*—Pitts & Brittian, P.C.

(57) ABSTRACT

A battery-powered transmitter which emits an audible sound or RF signal, including a housing which is mountable to the collar for a pet, for example. The present device is switchable between "on" and "off" modes of operation by means of a rotary cap whose rotational position effects switching of the device between its "on" and "off" modes of operation. Tactile and visual indication of the then-current operational mode of the device is provided by means of the rotational position of the rotary cap and indicia provided on the housing of the device and on the rotary cap itself. The rotary cap of the present invention further provides for sealing of the rotary cap with respect to the housing against foul weather conditions, including immersion in water, while simultaneously providing for rotary motion of the cap for effecting switching of the device between its "on" and "off" operational modes, employing an expansible seal between the cap and the housing.

25 Claims, 3 Drawing Sheets

28 30 29 24 20 76 12 74 56 22 53 18 34 16 32 36 57 62 26 15 70 58 14 50 60 72 55 OFF ON 26
42
83
99
86
88
80
33
85

33
40
44
42
43

43
33
5
44
5
42

26
80
97
99

ROTATABLE LID SWITCH HAVING FOUL WEATHER FEATURE

FIELD OF INVENTION

The present invention relates to switches useful in devices for ascertaining the location of a remotely located out-of-sight pet employing audible sound generated by a battery-powered transmitter which is selectively switchable between on and off positions. Particularly, the present invention relates to a device of the type described wherein the transmitter is selectively switchable by means of a rotary lid or cap switch having a foul weather, a splash proof, and/or waterproof feature.

BACKGROUND OF THE INVENTION

In the prior art, various pet locators such as bells and the like have been employed to provide as indicators of the location of an animal, such as a pet. These devices commonly provide a substantially constant or repetitive output of sound. Further, in the prior art, it has been proposed to employ a battery-powered transmitter which is attachable to a collar which encircles the neck of a pet and which is switchable between "on" and "off" modes of operation. The known prior art devices suffer from malfunction, corrosion, and/or other deleterious effects by reason of the exposure of their switching mechanism to adverse environmental conditions, such as snow or rain or instances where hunting dog enters a body of water, for example.

SUMMARY OF THE INVENTION

In accordance with one aspect of the present invention, there is provided a battery-powered transmitter which emits an audible sound and which includes a housing which is mountable to the collar for a pet, for example. The present device is switchable between "on" and "off" modes of operation by means of a rotary cap whose rotational position effects switching of the device between its "on" and "off" modes of operation. Tactile and visual indication of the then-current operational mode of the device is provided by means of the rotational position of the rotary cap and indicia provided on the housing of the device and on the rotary cap itself. The rotary cap of the present invention further provides for sealing of the rotary cap with respect to the housing against foul weather conditions while simultaneously providing for rotary motion of the cap for effecting switching of the device between its "on" and "off" operational modes, employing an expansible seal between the cap and the housing.

In one embodiment, the rotary cap includes a planar geometrically shaped conductor embedded within the interior wall of the closed end of the cap and having its outer surface essentially flush with the outer surface of the inner wall of the closed end of the cap, thereby positioning the conductor for simultaneous engagement with first and second electrical contacts disposed within the housing upon rotation of the cap to a preselected position relative to the housing, and resultant completion of an electrical circuit suitable to cause the device to apply power and thereby provide an indication of the then-current location of the pet. In like manner, by changing the rotational position of the cap, electrical continuity between the first and second contacts is broken to halt the generation of sound by the device.

DETAILED DESCRIPTION OF THE INVENTION

Figure 1:
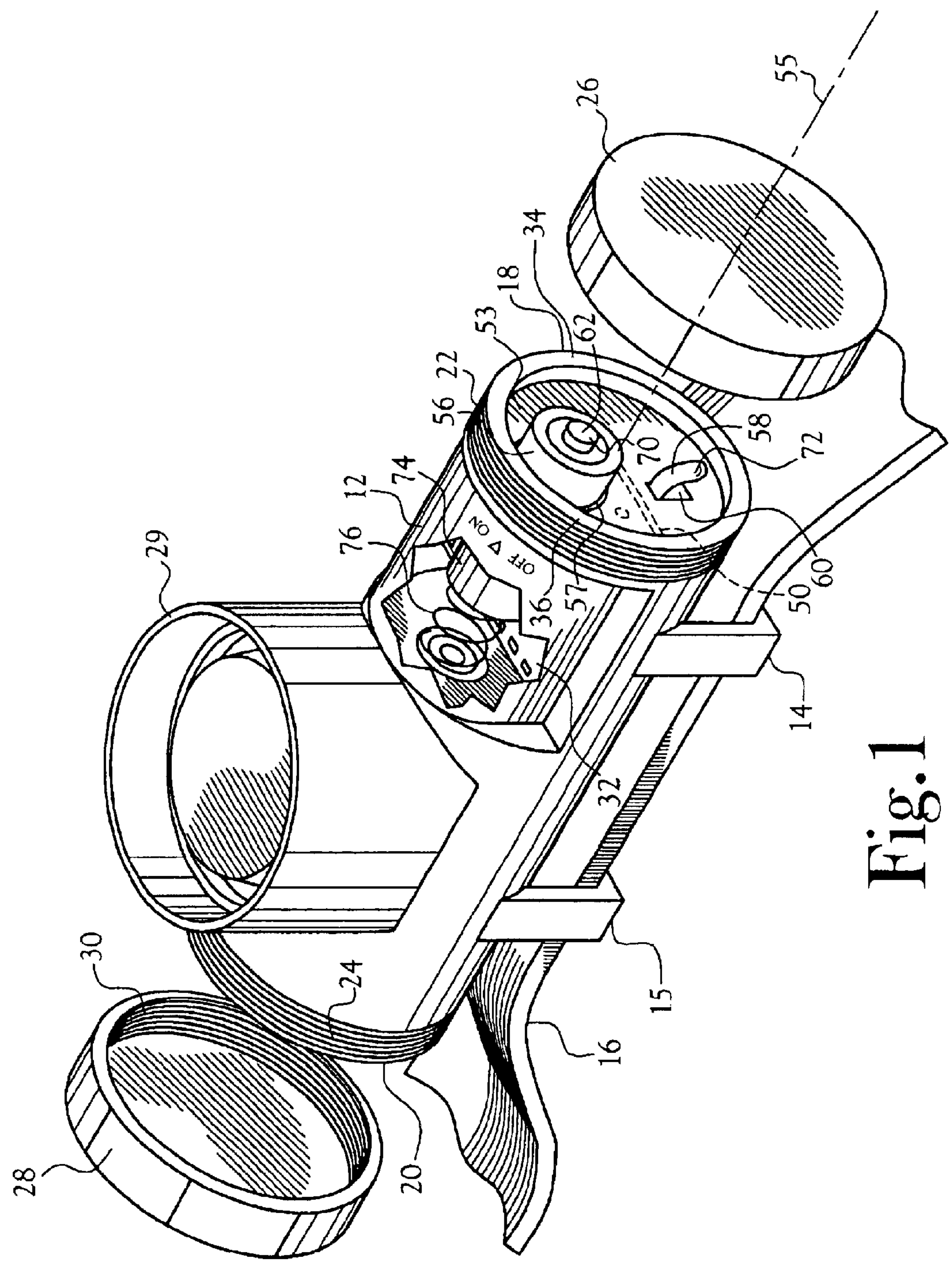
FIG. 1 is a representation, partly exploded, of one embodiment of a device which depicts various of the features of the present invention.

Referring to the several Figures, one embodiment of a device 10 embodying various of the features of the present invention is depicted. The depicted device includes a hollow housing 12 having a pair of loop-type leg members 14 and 15 projecting therefrom and defining means for mounting of the device on a collar 16 encircling the neck of a pet, for example.

The depicted housing 12 includes first and second opposite and outwardly opening ends 18,20, respectively, each end being provided with external threads 22,24 adapted to receive thereon an internally threaded cap 26,28, respectively, for effectively closing the open ends of the housing.

The housing further includes a sound generator housing 29 and serves to house a circuit board 32 containing those electrical components required to generate an audible sound at repeated time intervals when the device is switched "on". As desired, the device may be provided with electrical components necessary to selectively alter the time interval, the duration and/or the decibel level of the audible sound emitted by the device. The electrical circuitry and associated switches, etc. are well understood by one skilled in the art and need not be described herein in detail.

Figure 3:
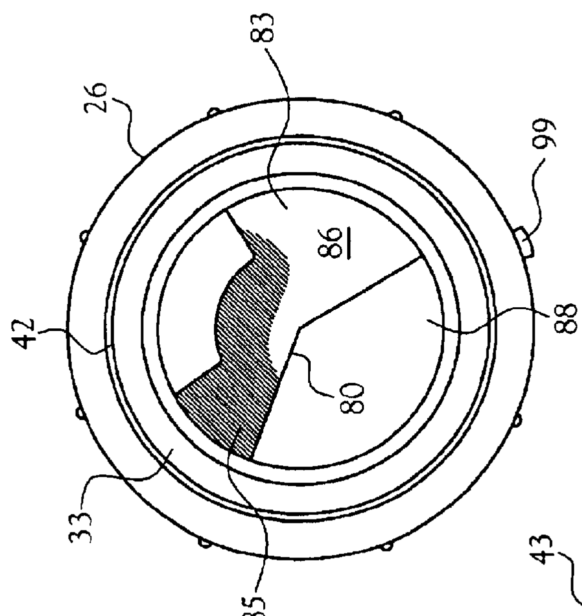
FIG. 3 is a bottom plan view of the rotary cap depicted in FIG. 2.
Figure 2:
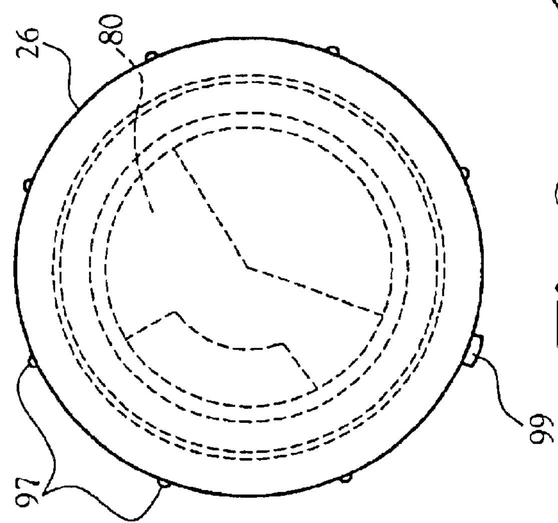
FIG. 2 is top plan view of the rotary cap of the device depicted in FIG. 1.
Figure 6:
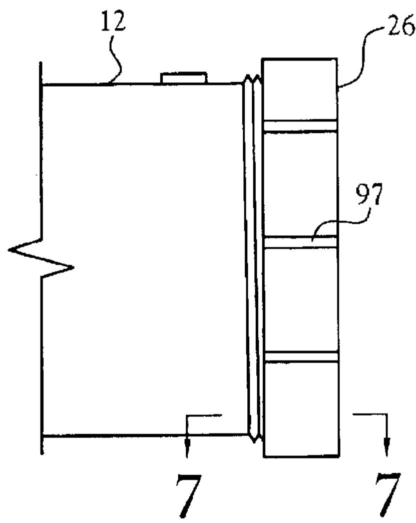
FIG. 6 is a side elevational view of the device depicted in FIG. 1.

Referring specifically to FIGS. 1–3, the cap 26 is of conventional construction and includes an inner sealing ring 33 suitable to seal the first end 18 of the housing against foul weather conditions, including "waterproofing" the end 18, when the cap is tightly threaded onto the threads 22 on the end 18 of the housing.

In accordance with one aspect of the present invention, the second end 20 of the housing and the cap 28 are complementarily designed to close the second end 20 of the housing while still providing for as much as a quarter turn of the cap without breaking the seal between the cap and the housing. It is this latitude of rotary motion of the cap 26 which the present inventor has found to permit the cap 26 to perform a switching function and a sealing function. That is, rotation of the cap between first and second rotational positions of the cap 26 relative to the threads 22 on the end 18 of the housing selective functions to turn the device "on" or "off", but without breaking of the seal between the cap and the end of the housing. Whereas such extensive rotary movement of the cap would normally break the seal between the cap and the end of the housing and thereby allow water to enter the housing, the present inventor has found that by employing a specially designed resilient ring 33.

The preferred resilient sealing ring 33 disposed between the cap 26 and the end 18 of the housing is depicted in FIGS.

Figure 5:
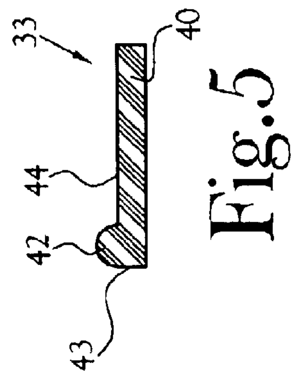
FIG. 5 is a cross-sectional view of the sealing ring depicted in FIG. 4.
Figure 4:
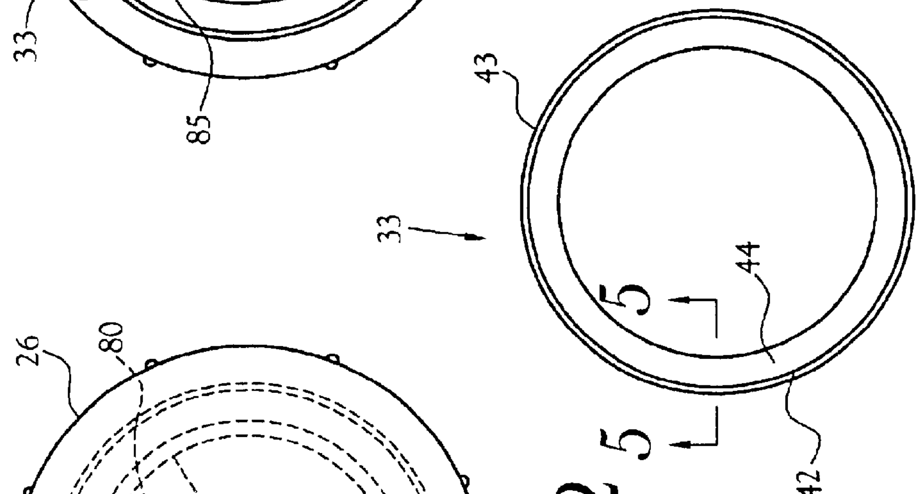
FIG. 4 is a representation one embodiment of a sealing ring useful in the present invention.

4 and 5. Notably, as best seen in FIG. 5, the resilient ring 33 of the present invention includes a body portion 40 which is generally of rectangular cross-section but which further includes an outermost rim 42 which is generally hemispherical in cross-section and is integrally formed on the outer perimeter 43 of the top surface 44 of, and projects from, the body portion 40 of the ring 33 to thereby position the rim 42 between the flat circular face 34 of the end 18 of the housing and the inner end surface of the cap. One suitable material of construction for the ring of the present invention is a rubber or polymeric elastomer available from Advanced Elastermer Systems having a Shore A durometer value of between about 50 and about 90. In any event, the depicted embodiment of the sealing ring 32 of the present invention, the ring provides a preferred embodiment for effecting the desired sealing of the cap with respect to the threaded end 8 of the housing. However, it will be recognized that other cross sectional geometries may be acceptable. For example, the cross-sectional geometry of the rim 42 of the ring may be of any geometry which provides for the rim 42 to be resiliently interposed between the cap and the immediately adjacent threaded end of the housing and the side wall of the cap such that there is formed a resilient annular seal between the cap and the end of the housing, that is, between the rim portion of the ring and the outer surface 34 of the end 18 of the housing.

In the depicted embodiment of the present invention, end 18 of the housing is provided internally thereof with a mounting plate 50 of electrically non-conductive material. This plate is fixedly mounted within the end 18 of the housing substantially parallel to the longitudinal centerline 55 of the housing and serves to mount the circuit board 32 within the housing. A further generally disc-shaped end plate 53, also of non-electrically conductive material is provided to substantially close end 18 of the housing 12 except for a slot 57 which serves to support one end 50 of an elongated battery 56 within the slot 57 in the plate. Further, a spring contact 58 which is resiliently mounted on, and in electrical communication with the circuitry on the circuit board, projects through an opening 60 in the plate and is inherently biased away from the open end of the housing. Thus, as seen in FIG. 1, one terminal 62 of the battery 56 which is exposed outwardly from the plate and adjacent the open end 18 of the housing defines a first electrical contact 70. The spring contact 58 defines a second electrical contact 72 which is physically spaced apart from the first electrical contact. As noted, the spring contact 58 is inherently biased away from (outwardly from) the open end 18 of the housing. That end 74 of the battery which is disposed most inwardly of the inner volume of the housing engages a spring 76 which is associated with and in electrical communication with the circuitry of the circuit board 32. Thus, the first and second electrical contacts are both spring biased outwardly of the open end of the housing, hence toward the cap 26 when the cap is threaded onto the end 18 of the housing, and are thereby positioned to be simultaneously engaged by an electrical conductor 80 mounted in the cap 26 and thereby close the circuitry associated with the circuit board and generate an audible sound or RF signal, for example. This opening and closing of the circuitry effects the turning "on" and "off" of the device and in the depicted embodiment is effected by rotational motion of the cap 26 as the cap is threaded onto or off the threads 22 of the end 18 of the housing. More specifically, each of the first and second electrical contacts 70 and 72 are biased to respective locations outboard of the plane occupied by the outermost circular face 34 of the housing.

More specifically, and referring to FIGS. 1–3 and 7, in the depicted embodiment, the inner end wall 82 of the cap 26 is provided with a circular depression 84 within which there is fixedly mounted an electrical conductor 80. In the depicted embodiment, this electrical conductor is flat and planar and somewhat elongated, but is provided with a special geometry when viewed in a plan view (see FIG. 3). The overall length of the conductor 80 is chosen to be sufficient to permit the conductor, when the cap is rotated to a first rotational position relating to the housing, to simultaneously engage the first and second electrical contacts 70,72 (i.e., the battery terminal and the spring contact). In the depicted embodiment, one end 83 of the conductor 80 is of a width which is about twice the width of the opposite end 85 of the conductor. Notably, these opposite ends of the conductor are disposed about 180 degrees apart about the centerline 55 of the cap. The depth of the depression 84 in the inner end surface of the cap is chosen to be essentially equal to the thickness of the conductor so that the outer surface 86 of the conductor is mounted essentially flush with the surface 88 of the inner end wall of the cap, thereby permitting ready sliding motion between the first and second electrical contacts 70,72 and the conductor 80 as the cap is rotated to its first rotational position relative to the housing.

In the depicted embodiment, it will be noted that the somewhat elongated geometry of the conductor 80 and its position within the cap are chosen such that the more narrow end 83 of the conductor is disposed in electrically conductive engagement with the contact 72, and its opposite wider end 85 is in electrically conductive engagement with the contact 70 (battery terminal) when the cap has been threaded onto the end of the housing and tightened to the "ON" position and commencement of generation of an audible sound or RF signal by the device. This sound or signal continues so long as the device is "ON". Rotation of the cap (loosening of the cap) by about one-quarter turn or less is sufficient to move the end 83 of the conductor out of engagement with the contact 72 and thereby render the device inoperative. The wider end 85 of the connector provides for variance of the location of the battery terminal relative to the location of the terminal 70, hence lessening of any need to precisely position the cap such that the circuit between the battery terminal and the contact 70 is closed or opened.

Figure 7:
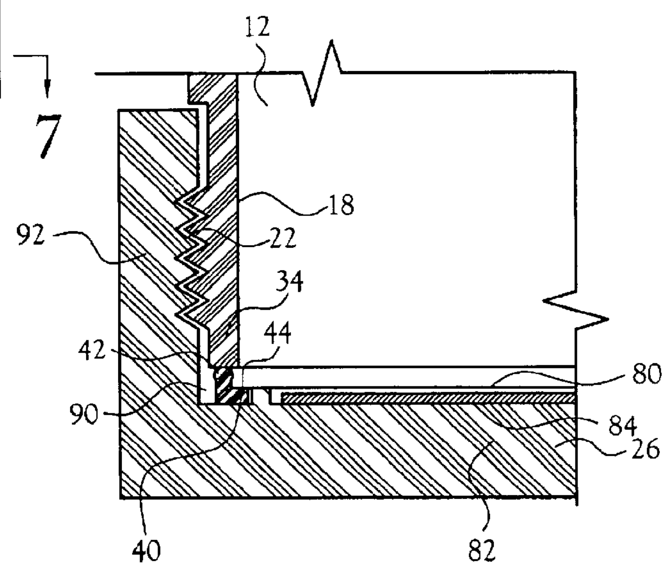
FIG. 7 is a sectional view taken generally along the line 7—7 of FIG. 6.
Figure 8:
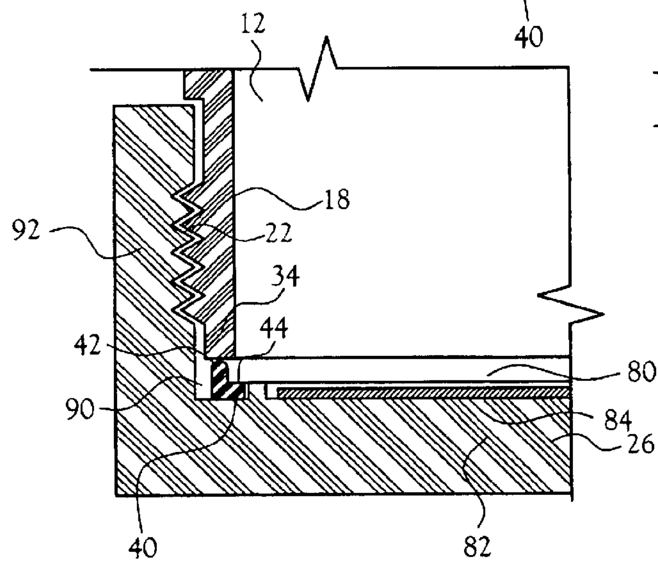
FIG. 8 is a partially exploded view of the bottom left corner of the embodiment depicted in FIG. 7.

Referring to FIG. 7, it will be noted that the cap 26 is provided with a further circular depression 90 in the inner surface of the cap at a location immediately adjacent the inner side wall 92 of the cap for the receipt therein of the sealing ring 32. In the depicted embodiment, the depth of this depression is less than, about one-third to one-half, the thickness of the body portion 40 of the sealing ring. By this means, as much as one-half to two-thirds of the thickness of the sealing ring projects above the inner surface 88 of the cap. Further, this disposition of the sealing ring positions the raised circular rim 42 of the sealing ring in register with the circular outer face 34 of the cap, and when the cap is threaded onto the end 18 of the housing, this circular rim 42 engages the outermost flat face 34 of the end 18 of the housing to effect a waterproof seal therebetween before the cap has been fully threaded onto the housing. By this means, when the cap is threaded onto the end of the housing, less than full threading of the cap onto the end of the housing, effects water-tight sealing between the cap and the end of the housing, leaving as much as a quarter of a turn of the cap on the end of the housing available to further compress the sealing ring between the cap and the end of the housing. It is this additional rotational motion of the cap provided for by the compressibility and resiliency of the sealing ring, which the present inventor employs to effect movement of the conductor 80 disposed within the cap into electrical connection with the first and second electrical contacts which project from the end of the housing. That is, tightly threading the cap onto the end of the housing rotates the conductor with the rotation of the cap and brings the conductor into simultaneous electrical communication with the first and second electrical contacts 70,72 to turn the device "on". To turn the device "off", one only need to unscrew the cap by less than about a quarter turn to disengage the conductor and the electrical contacts. At all times during this limited degree of rotation of the cap relative to the end of the housing, the compressibility and resiliency of the sealing ring are chosen to be sufficient to cause the sealing ring to compress or rebound, as the case may be, as the cap is rotated through the limited degree of rotation. Thus, the action of turning the device "on" and "off" is performed by rotation of the cap without ever breaking the waterproof seal between the cap and the end of the housing.

Thus, it will be apparent to one skilled in the art that the durometer value exhibited by the material of the ring will be a function of the cross-sectional geometry of the rim in particular. That is, soft resilient materials may dictate a relatively larger size, and/or different geometry, rim to ensure adequate compression sealing, and less resilient materials may dictate another geometry for the rim. The ring must exhibit excellent resiliency and rebound properties and resist abrasion by repeated rotary motion of the cap by as much as a quarter turn relative to the housing when the cap is rotated to turn the device "on" or "off". Moreover, it is to be recognized that the device of the present invention is exposed to substantial shock forces, such as when a pet wearing the device on its collar, for example a hunting dog, may run through thick brush, jump around in a boat, climb into a boat, etc. and thereby subject the present device to relatively severe blows which tend to loosen the cap 26 on the housing 12 with resultant turning "off" of the device and cessation of the desired emanation of sound or RF signal from the device. Such cessation of sound from the device obviously defeats the purpose of the device, as well as opens up the possibility of water entering the device and consequential damage to the device.

Notably, in the present invention the preferred resilient ring 32 is snugly, hence frictionally, held within the depression 90 such that the ring remains securely in place even when the cap 26 is fully removed from the housing 12. Tactile identification of the rotational position of the cap is facilitated by means of elongated lugs 97 which are equally spaced apart about the outer circumference of the cap 26. In a preferred embodiment, one of the lugs 99 is larger (e.g. wider) than the remaining lugs. The rotational position of this wider lug relative to the starting position of the cap for threading the cap onto the housing, in combination with the number and pitch of the cooperating threads on the cap and on the end of the housing, is adjacent the "ON" position of the device when the cap is fully and snugly threaded onto the housing, thereby affording the pet owner assurance that the device is in the desired operative state. Vice versa, when the lug 99 is rotational out of sync with the "ON" position of the device, the pet owner may tactically ascertain that the device is "OFF". When the device is "ON," it emits a continuous (or periodic) audible or radio frequency (RF) signal. Tactile indication may be useful when the device is designed to emit an RF signal.

Whereas the present invention has been described in connection with the embodiment depicted in the several Figures, it will be recognized by one skilled in the art that other embodiments are suitable for obtaining equivalent functioning of the present device. For example, the battery itself could be contained within the cap without departing from the present invention. Moreover, the precise geometry of the sealing ring may be altered while still permitting the described limited degree of rotation of the cap relative to the end of the housing without breaking the required seal between the cap and the end of the housing. It is therefore, intended that the invention be limited only as set forth in the claims appended hereto.

Having thus described the aforementioned invention, we claim:

1. A device for assisting in the location of an animal including a housing, an electrical circuit suitable for the generation and transmission of an audible and/or radio frequency signal, and a battery comprising:

an outwardly directed opening defined in the housing, first and second electrical contacts which, when simultaneously contacted by an electrical conductor close the electrical circuit causing power to be applied, and when not simultaneously contacted by said electrical conductor open the electrical circuit and render the device powerless, a cap formed of an electrically non-conductive material rotatably mounted in covering relationship to said opening defined in the housing, said cap including an inner surface having associated therewith said electrical conductor adapted to rotate with rotation of said cap with respect to the housing to simultaneously contact said first and second electrical contacts at a first rotational position of said cap with respect to the housing and to be out of simultaneous contact with said first and second electrical contacts at a second rotational position of said cap with respect to the housing, and a resilient seal disposed between said cap inner surface and the housing in position to effect a seal between said cap and the housing in either of said first and second rotational positions of said cap relative to the housing.

2. The device of claim 1 wherein said cap includes a closed end having a substantially flat planar inner surface and wherein said electrical conductor includes a flat planar outer surface and said electrical conductor is embedded in said inner surface of said cap with its outer surface essentially flush with said inner surface of said cap.

3. The device of claim 2 wherein said outer surface of said electrical conductor is of a geometric configuration which provides for simultaneous engagement thereof with said first and second contacts over a limited range of rotational movement of said cap after sealing of said cap with respect to said housing.

4. The device of claim 3 wherein said limited range extends over about 45 degrees of rotation of said cap.

5. The device of claim 4 wherein said range provides for continued engagement between said electrical contact and said first electrical contact extend over about 30 degrees of rotational movement of said cap, said 30 degree range being within said 90 degree range.

6. The device of claim 1 wherein said first electrical contact comprises one pole of a battery and said second electrical contact comprises a contact associated with the electrical circuit.

7. The device of claim 6 wherein each of said first and second electrical contacts is biased toward said inner surface of said cap and said conductor contained therein when said cap is threaded onto said housing.

8. The device of claim 1 wherein said cap is formed of an electrically non-conductive material.

9. The device of claim 1 wherein said seal comprises a ring of a resilient material disposed about the outer peripheral edge of said inner surface of said cap.

10. The device of claim 9 wherein said resilient material has a Shore A durometer of between about 50 and about 90.

11. The device of claim 1 wherein said cap is generally cup-shaped having an internally helically threaded wall portion.

12. The device of claim 11 wherein said opening defined in the housing includes a portion thereof having external helical threads adapted to matingly receive thereon said internally threaded wall portion of said cap.

13. A device for assisting in the location of an animal including a housing, an electrical circuit suitable for the generation and transmission of an audible and/or radio frequency signal, and a battery comprising:

an outwardly directed opening defined in the housing;

first and second electrical contacts which, when simultaneously contacted by an electrical conductor close the electrical circuit causing power to be applied, and when not simultaneously contacted by said electrical conductor open the electrical circuit and render the device powerless;

a cap formed of an electrically non-conductive material rotatably mounted in covering relationship to said opening defined in the housing;

said cap including a closed end having a substantially flat planar inner surface and wherein said electrical conductor including a flat planar outer surface, said electrical conductor is embedded in said inner surface of said cap with said electrical conductor outer surface essentially flush with said inner surface of said cap, wherein said electrical conductor is adapted to rotate with rotation of said cap with respect to the housing to simultaneously contact said first and second electrical contacts at a first rotational position of said cap with respect to the housing and to be out of simultaneous contact with said first and second electrical contacts at a second rotational position of said cap with respect to the housing; and a resilient seal disposed between said cap inner surface and the housing in position to effect a seal between said cap and the housing in either said first and second rotational positions of said cap relative to the housing.

14. The device of claim 13 wherein said outer surface of said electrical conductor is of a geometric configuration which provides for simultaneous engagement thereof with said first and second contacts over a limited range of rotational movement of said cap after sealing of said cap with respect to the housing.

15. The device of claim 14 wherein said limited range extends over about 45 degrees of rotation of said cap.

16. The device of claim 15 wherein said range provides for continued engagement between said electrical contact and said first electrical contact extend over about 30 degrees of rotational movement of said cap, said 30 degree range being within said 90 degree range.

17. The device of claim 16 wherein said first electrical contact comprises one pole of a battery and said second electrical contact comprises a contact associated with the electrical circuit.

18. The device of claim 17 wherein each of said first and second electrical contacts is biased toward said inner surface of said cap and said conductor contained therein when said cap is threaded onto the housing.

19. The device of claim 18 wherein said seal comprises a ring of a resilient material disposed about the outer peripheral edge of said inner surface of said cap, said resilient material having a Shore A durometer of between about 50 and about 90.

20. The device of claim 19 wherein said cap is formed of an electrically non-conductive material and said cap is generally cup-shaped having an internally helically threaded wall portion.

21. The device of claim 20 wherein said opening defined in the housing includes a portion thereof having external helical threads adapted to matingly receive thereon said internally threaded wall portion of said cap.

22. A device for assisting in the location of an animal including a housing, an electrical circuit suitable for the generation and transmission of an audible and/or radio frequency signal, and a battery comprising:

an outwardly directed opening defined by an end portion of the housing;

first and second electrical contacts which, when simultaneously contacted by an electrical conductor close the electrical circuit causing power to be applied, and when not simultaneously contacted by said electrical conductor open the electrical circuit and render the device powerless;

a cap formed of an electrically non-conductive material rotatably mounted in covering relationship to said opening defined by said end portion of the housing;

said cap including a closed end having a substantially flat planar inner surface having an outer peripheral edge within said closed end;

said electrical conductor including a flat planar outer surface, said electrical conductor is embedded in said inner surface of said cap with said electrical conductor outer surface essentially flush with said inner surface of said cap, said electrical conductor rotates with rotation of said cap with respect to the housing, wherein said electrical conductor is of a geometric configuration adapted to simultaneously contact said first and second electrical contacts over a limited range of rotational movement of said cap between a first rotational position of said cap with respect to the housing, and said electrical conductor to be out of simultaneous contact with said first and second electrical contacts at a second rotational position of said cap with respect to the housing; and a resilient seal disposed between said cap inner surface and the housing, said seal including a ring of a resilient material disposed about said outer peripheral edge of said inner surface of said cap, said resilient seal in position to effect a waterproof seal between said cap and the housing in either of said first and second rotational positions of said cap relative to the housing.

23. The device of claim 22 wherein said limited range of rotational movement of said cap provides for continued engagement between said electrical conductor and said first electrical contact extend over about 45 degrees of rotational movement of said cap.

24. The device of claim 23 wherein said ring of said seal having sufficient compressibility to provide said ring to compress or rebound as said cap is rotated through said limited range of rotational movement relative to the housing, whereby the rotation of said cap between said first and second rotational positions is accomplished without disengaging the waterproof seal between said outer peripheral edge of said cap inner surface and said end portion of the housing.

25. The device of claim 24 wherein said first electrical contact comprises one pole of a battery and said second electrical contact comprises a contact associated with the electrical circuit.

* * * * *